United States Patent [19]
Lam

[11] Patent Number: 5,916,022
[45] Date of Patent: Jun. 29, 1999

[54] WINDSHIELD DEFROSTER ASSEMBLY

[76] Inventor: Chic H. Lam, 48935 Pheasant, New Baltimore, Mich. 48047

[21] Appl. No.: 09/013,073

[22] Filed: Jan. 26, 1998

[51] Int. Cl.[6] ...................................................... B60S 1/54
[52] U.S. Cl. ............................................. 454/123; 15/313
[58] Field of Search ............................... 454/85, 93, 123; 15/313

[56] References Cited

U.S. PATENT DOCUMENTS

| | | | |
|---|---|---|---|
| 1,868,142 | 7/1932 | Heaton | 454/123 |
| 2,187,281 | 1/1940 | Pagliaroni | 454/123 |
| 2,704,384 | 3/1955 | Raish, Sr. | 454/123 |
| 2,926,396 | 3/1960 | Hess | 454/123 |
| 3,416,428 | 12/1968 | Heller | 454/123 |

*Primary Examiner*—Harold Joyce
*Attorney, Agent, or Firm*—Peter A. Taucher; David L. Kuhn

[57] ABSTRACT

A defroster assembly uses heat from an engine's exhaust to heat the exterior of a windshield and the wipers thereon. The assembly comprises an air intake mechanism shared with the engine's air filter. The air intake mechanism leads to air ducts spaced from the engine block. Nodes in the air ducts encircle exhaust outlet pipes leading from the engine so that heat of the engine exhaust is transferred to air in the ducts. The assembly includes a vent subassembly for directing a stream of air in a laminar flow along the windshield. A fan of the assembly draws air from the ducts and forces it through the vent subassembly.

6 Claims, 2 Drawing Sheets

WINDSHIELD DEFROSTER ASSEMBLY

GOVERNMENT USE

The invention described here may be made, used and licensed by or for the U.S. Government for governmental purposes without paying me any royalty.

BACKGROUND AND SUMMARY

A problem with driving automobiles in cold weather is ice forming on windshield wipers and subsequent inability to keep the windshield clear. Another problem is frost formation on the windshield, especially when the vehicle's engine has not reached normal operating temperature.

My defroster assembly addresses the foregoing problems. The assembly uses heat from an engine's exhaust, not the engine block, to defrost or de-ice heat the exterior of a windshield and its wipers. Hence, low engine block temperature is not a problem. The assembly's air intake inlets lead to air ducts spaced from the engine block to avoid heat transfer therewith. Nodes in the air ducts encircle exhaust outlet pipes from the engine, so heat of engine exhaust gas transfers to air in the ducts. The assembly has a vent subassembly for directing air in a laminar flow along the windshield. A fan of the assembly forces heated air from the ducts through the vent subassembly to produce the laminar flow.

DETAILED DESCRIPTION

Figure 1:
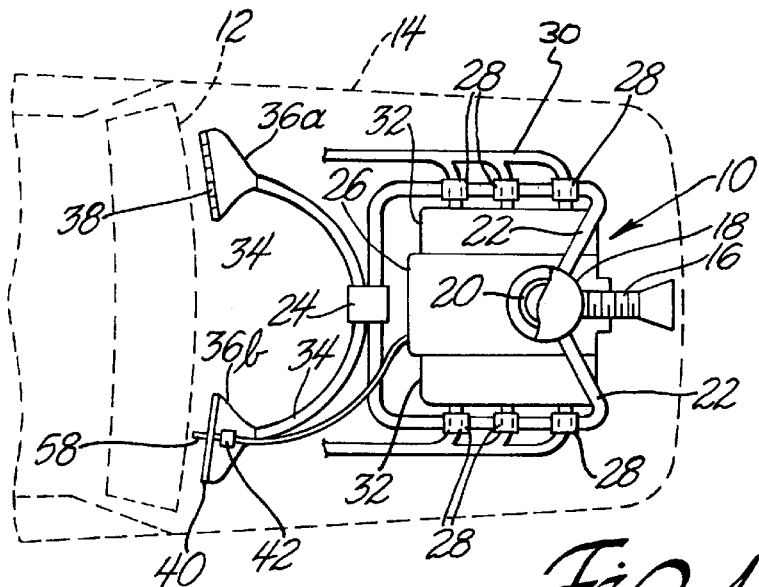
FIG. 1 is a plan view of the mechanical components of my defroster assembly.
Figure 3:
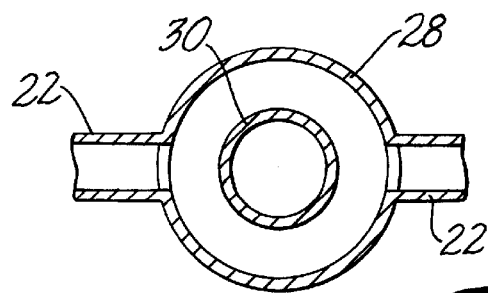
FIG. 3 is a cross sectional view showing the engagement between the nodes of my assembly and the engine exhaust outflow pipes.

In FIG. 1 is assembly 10 for defrosting the outside of a windshield 12 of an automotive vehicle 14. Assembly 10 has an air intake duct 16 for filter housing 18, which has air filter 20 partly shown therein. Leading from housing 18 are fan supply ducts 22 that extend to fan subassembly 24 just behind engine 26. Ducts 22 have nodes 28 encircling engine exhaust pipes 30 as shown in FIG. 3.

Pipes 30 lead from exhaust manifold 32 of engine 26. At nodes 28, engine exhaust heat in pipes 30 transfers to air in ducts 22. Ducts 22 and nodes 28 are spaced from engine 26, so they take no heat directly from the block of engine 26.

Figure 2:
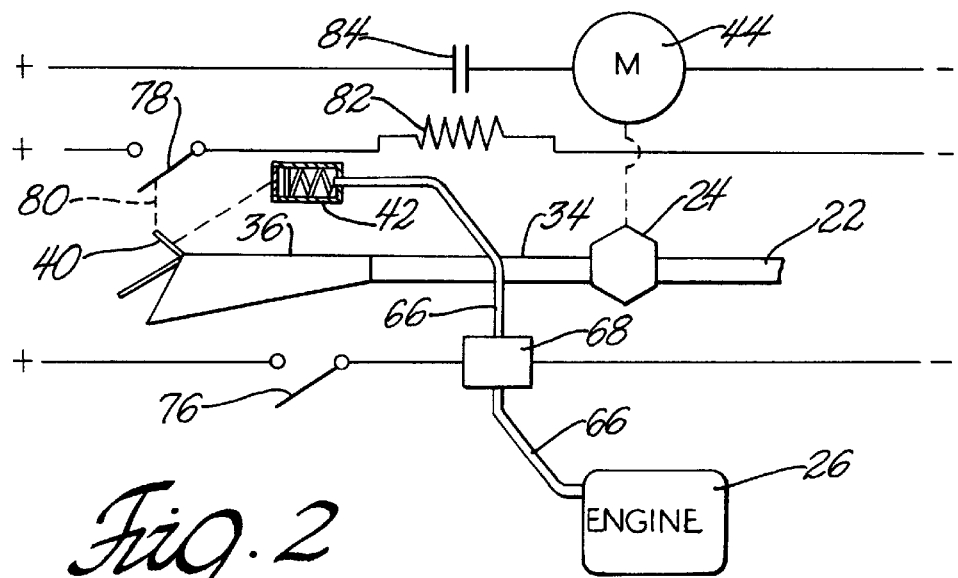
FIG. 2 is a semi-schematic depiction of my assembly which includes elements for controlling operation of the assembly.

Referring again to FIG. 1, ducts 22 carry heated air to fan subassembly 24 or other suitable mechanism to force air from ducts 22 through blower lines 34. Subassembly 24 is typically a small electric blower fan enclosed in a shroud open only to ducts 22 and lines 34, and the fan is driven by a suitable motor 44 (FIG. 2). Lines 34 feed the heated air from the fan subassembly to vent subassemblies 36a and 36b, which direct the air at windshield 12. In FIG. 1, the vent subassembly is shown at 36a without vent door 40 or door actuator 42, and part of the subassembly's fins 38 are shown. At 36b the subassembly's door 40 and door actuator 42 are shown but the fins are not.

Figure 5:
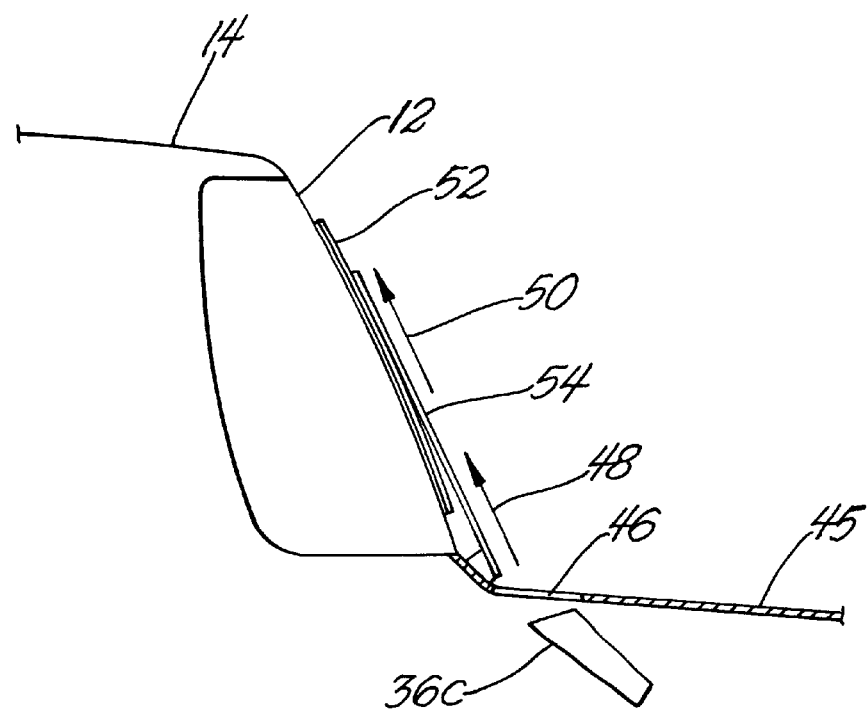
FIG. 5 is a partial sectional view showing the orientation of the vent subassembly relative to the windshield.

FIG. 5 is a side elevational view showing the position of the vent subassembly relative to windshield 12 and hood panel 45 of vehicle 14. The vent subassembly is represented by the outline at 36c. Subassembly 36c is tilted so that it aims a stream of heated air through hood aperture 46 and along windshield 12 as indicated by arrows 48 and 50. It is contemplated that the air stream will not only heat the exterior of windshield 12, but that the air stream will create a laminar flow over the windshield of the relatively clean air from vent subassembly 36c. The laminar flow will inhibit precipitation or road spray from reaching windshield 12 and thus improve driver visibility. This laminar flow, especially if heated, will also prevent ice formation on blade 52 of windshield wiper 54.

Figure 4:
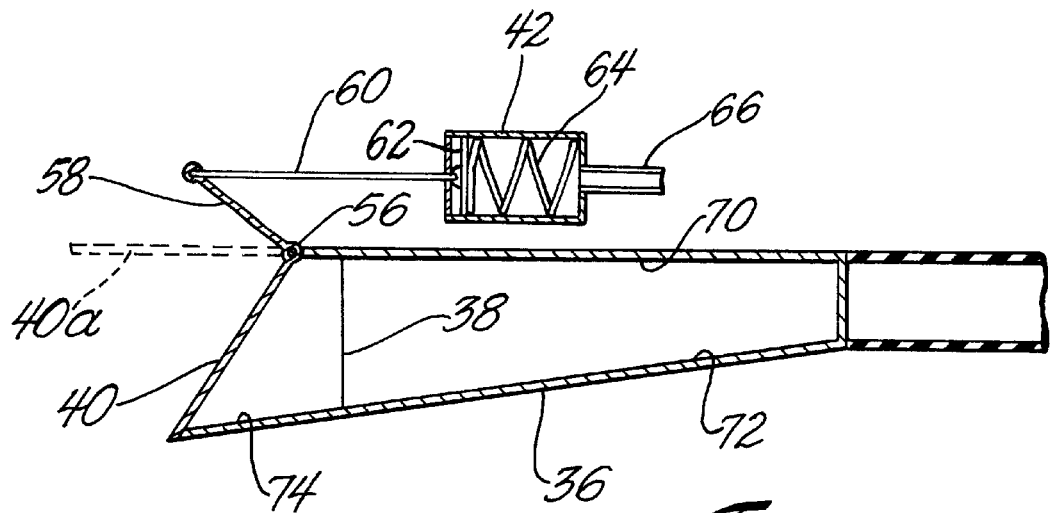
FIG. 4 is a sectional view of the vent subassembly.

FIG. 4 is a detailed sectional view of vent subassembly 36, where vent door 40 swings about hinge 56; door 40 opens in response to counterclockwise pivoting of lever 58 about the hinge. Vent door 40 prevents entry of foreign material into vent subassembly 36 when the subassembly is not in use. Lever 58 is pivoted by the translation of rod 60, which connects lever 58 to slide plate 62 of actuator 42. The slide plate is biased by spring 64 so that door 40 normally positively closed. Actuator 42 is a vacuum chamber having air evacuated via line 66 to vacuum switch 68 (FIG. 2) and thence to engine 26. When a vacuum forms in actuator 42, plate 62 slides against the bias of spring 64 and translates rod 60 to open door 40. Door 40 opens to position 40a where it lies in the same plane as shorter vent wall 70 and extends toward windshield 12. Door effectively becomes an extension of wall 70, so that door 40 opposes the upstream end 74 of longer vent wall 72. Opening door 40 thus extends vent subassembly 36 toward windshield 12 so the subassembly yields a more concentrated hot air flow at windshield 12 than would otherwise occur.

Operation of defroster assembly 10 is further explained in conjunction with FIG. 2, a semi-schematic drawing of the assembly. Operation starts when the vehicle's driver manually closes electrical switch 76 and thereby opens vacuum switch 68, so the vacuum created by engine 26 is communicated by line 66 to actuator 42. In response to the vacuum, actuator 42 opens door 40 and closes an electrical switch 78 having mechanical connection 80 with the door. Closing switch 78 energizes relay coil 82 and closes fan motor switch 84. As a result, motor 44 starts and fan assembly 24 forces air through lines 34 to vent subassembly 36. Note that motor 44 can not start until vent door 40 is open.

I do not desire to be limited to the exact details of construction or method shown herein since obvious modifications will occur to those skilled in the relevant arts without departing from the spirit and scope of the following claims.

What is claimed is:

1. An assembly for heating of a windshield and the associated windshield wipers of a vehicle, comprising:

means for admitting air into the assembly wherein the means for admitting air into the assembly is also means of admitting air to the engine, and the admitting means comprises:

an air filter; and an inlet in communication with the air filter;

an air duct of the assembly;

means for transferring heat of the engine exhaust to air in the assembly's duct, the transferring means comprising an exhaust outlet pipe leading from the engine and a node in the assembly's ducts contacting the exhaust outlet pipe;

means for directing a stream of air at the windshield, the directing means comprising a vent subassembly; and means for forcing air from the ducts through the vent subassembly.

2. The assembly of claim 1 wherein the vent subassembly comprises:

a door on the vent subassembly;

a door actuator connected to the door for opening and closing the door; and means to govern the door actuator.

3. The assembly of claim 2 further comprising means connected to the door for controlling the forcing means in response to positions of the door.

4. The assembly of claim 2 wherein the door actuator comprises:

a vacuum chamber;

a slide plate in the vacuum chamber;

a mechanical linkage between the plate and the door;

means to bias the slide plate;

means for evacuating the chamber and thereby sliding the plate against the bias of the biassing means.

5. The assembly of claim 2 wherein the vent subassembly further comprises:

a first wall;

a second wall opposed to the first wall and longer than the first wall;

a hinge connection between the first wall and the door, the door having a position where the door is in the same plane as the first wall, the door extends toward the windshield and the door opposes the second wall.

6. An assembly for defrosting and de-icing the exterior surface of a windshield and the associated windshield wipers of a vehicle wherein the assembly utilizes heat from an engine's exhaust to melt ice or snow at the windshield, the assembly comprising:

means for admitting air into the assembly the means for admitting air into the assembly is also means of admitting air to the engine, the admitting means including a filter;

air ducts of the assembly spaced from a block of the engine;

means for transferring heat of the engine exhaust to air in the assembly's ducts, the transferring means comprising exhaust outlet pipes leading from the engine and nodes in the assembly's ducts contacting the exhaust outlet pipes, the nodes spaced from the block;

means for inhibiting precipitation or road spray from reaching the windshield, the inhibiting means directing a stream of air into a laminar flow along a surface of the windshield, the directing means comprising a vent subassembly; and means for drawing air from the ducts and forcing the air through the vent subassembly.

* * * * *